Feb. 9, 1943.                D. D. CRANDELL                2,310,217
                               WALL BOARD
                            Filed Nov. 22, 1939

INVENTOR
DEAN D. CRANDELL
BY
Beau, Brooks, Buckley & Beau.
ATTORNEYS

Patented Feb. 9, 1943

2,310,217

UNITED STATES PATENT OFFICE 2,310,217

WALLBOARD

Dean D. Crandell, Buffalo, N. Y., assignor to National Gypsum Company, Buffalo, N. Y.

Application November 22, 1939, Serial No. 305,703

2 Claims. (Cl. 154—45.9)

The present invention relates to wallboard and more particularly to that type of wallboard in which a cementitious core is covered with fibrous facing sheets.

Heretofore in the manufacture of wallboard of the type referred to, the cementitious core, comprising a plastic mix of, for instance, calcined gypsum, water, and finely divided waste paper pulp, was fed between an upper and lower paper facing sheet as the same was being passed through master rolls set to produce board of the caliper desired. The provision of paper facing sheets made possible the production of a wallboard of considerably greater strength than the strength of the plaster core. In order to produce board of commercially acceptable characteristics, it has been impossible, heretofore, to use facing sheets of less than about 0.019 inch in thickness and designated in the trade as 60-pound chip paper. Many attempts have been made heretofore to employ paper of less weight and thickness for facing sheets for wallboard but all these attempts have produced board of inferior characteristics and not acceptable for the purposes intended.

Where thin lightweight kraft paper was employed as a facing sheet, incomplete bonding resulted, while with lightweight chip paper, the resulting board possessed insufficient strength for the purposes intended. Furthermore with smaller caliper papers, the facing sheet wrinkles, bulges and corrugates and the paper separates from the core at the bonding surface showing the presence of a bond weaker than the paper itself. The generally accepted standard was 60-pound chip paper.

When wallboard is cut on the job the board is scored on one or both sides at the desired line of severance and the board then broken along this line. It is often necessary on the job to cut wallboard and a good clean break is required in order to get a tight fit at the board edges. With thick papers the scoring is often inadequate to produce a clean break and in consequence much wastage is encountered. By the provision of low caliper lightweight paper, clean breaks of the board are obtained upon scoring the surfacing paper.

The present invention provides a wallboard in which a cementitious core is faced with paper of materially less thickness and of less weight per unit area than has been possible of employment heretofore with the production of a board of comparable strength.

The present invention also provides a wallboard having a thin lightweight facing paper and wherein the strength of bond between the core and the facing paper is equal to or greater than the strength of the paper.

The present invention also provides a wallboard readily and easily scored so that the same may be broken and severed cleanly.

The present invention, therefore, provides a means for producing wallboard of standard strength and quality wherein material economies are effected in paper costs.

As an additional advantage, the present invention provides a wallboard of the type described wherein thin lightweight facing paper is bonded to the cementitious core and wherein the bond between the paper and core is materially better than bonds heretofore produced.

Further objects and advantages of the invention will appear hereinafter and will be pointed out with particularity in the claims.

Figure 1:
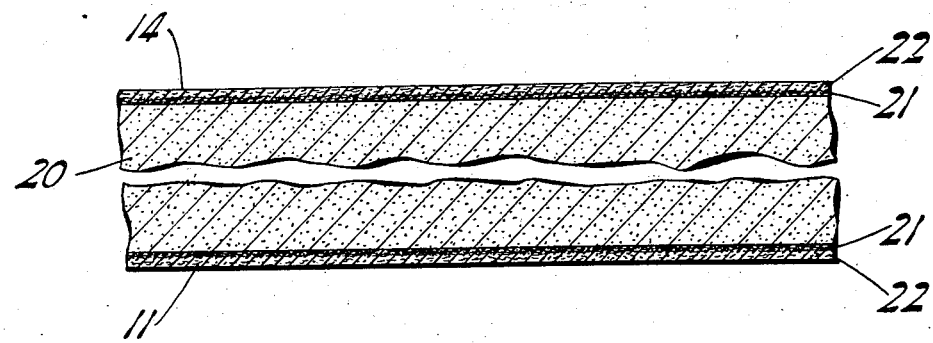
Fig. 1 represents an enlarged sectional view of wallboard of the present invention.
Figure 2:
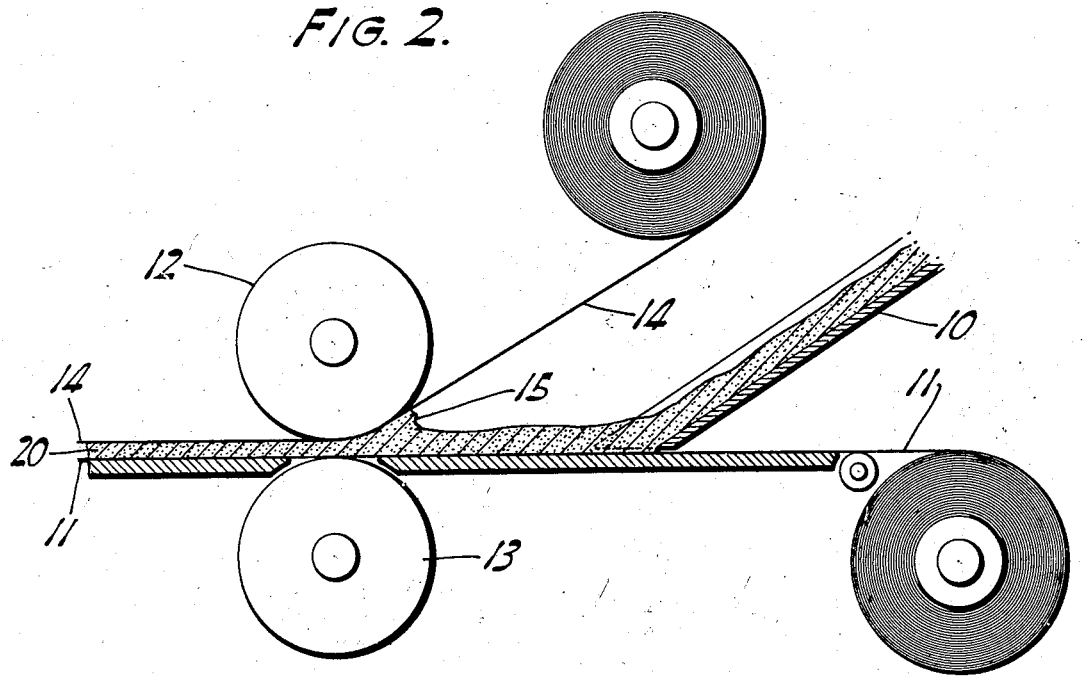
Fig. 2 shows the forming end of a wallboard machine and illustrates diagrammatically the feed of the plastic core between facing sheets.

In accordance with the present invention, a plastic mix of any suitable composition, capable of being fed between facing sheets, of being formed between forming rolls and capable of setting or crystallizing in a relatively short period of time, is fed from a mixing machine through a feed chute 10 onto a moving paper sheet 11 which constitutes the front face of the finished wallboard. This sheet is continually advanced along the wallboard machine from the forming end thereof to the drying end. The lower sheet is advanced between a pair of forming or caliper rolls 12 and 13 set to produce wallboard of the thickness desired. As is well known in the art, the edges of the lower sheet may be scored and upturned to form paper-coated edges of the wallboard or may be rolled to produce a round folded edge. The wallboard is completed by passing a second paper sheet 14 through the forming rolls and on top of the plastic mass of core material 15 fed upon the lower sheet. There is thus produced a continuously advancing wallboard completely covered by facing paper. After crystallization or set of the core the product is then cut into the desired lengths, passed into a dryer and dried.

In accordance with the present invention and in contrast to prior practices, the paper sheets for facing the core comprise a paper in which one side thereof is formed of relatively weak fibers that are highly water absorbent while immediately adjacent is a section formed of relatively long, strong fibers.

In general chip paper is made of waste papers and fabrics and therefore the fibers of such papers are degraded to a large extent. Furthermore, the fibers of chip paper are short and possess comparatively little fiber strength. Fibers of this type are additionally relatively water absorbent. In contrast to this, so-called sulfate and other chemical fibers are relatively long and strong as they are virgin fibers. The paper used in manufacturing the wallboard of the present invention is fabricated from both long, strong fibers, and the short, weak, relatively water absorbent fibers from waste. One side of the paper is therefore of short, weak, relatively water absorbent fibers placed adjacent a section of long, strong fibers. In general, the short fibers constitute about one-third the thickness of the finished paper. Thus a paper about 0.01 inch thick will have 0.003 inch of short fibers or less, the remaining thickness being long fibers. In general, the facing sheet of the present invention will have a thickness of less than about 0.015 inch and a weight of less than about 45 pounds per thousand square feet. Paper 0.01 inch thick and 30 pounds in weight has been found eminently satisfactory.

The facing paper 11 and 14 employed in the present invention comprises a paper sheet, the exposed side of which, after application to the core, is made of short, weak fibers and fibers that are relatively water absorbent. Adjacent this surface is a section of long, strong kraft fibers. In order to induce good bonding of this kraft fiber to the plastic cementitious core, about 8–30% of chip fibers are added to the kraft fibers. This produces sufficient weakness and water absorbency in the kraft fibers so that this layer will bond with the core. The result is a wallboard with an excellent water absorptive surface, such as is especially desirable in a plaster lath.

In accordance with the invention it has been found that the slurry of the core, comprising for instance calcined gypsum, paper fiber and water, is able to penetrate the kraft layer or ply let down with a small proportion of chip fibers and carry a portion of the cementitious mix thereinto. As the calcium sulfate hemihydrate of the calcined gypsum is changed to less soluble dihydrate, the latter crystallizes in the let down kraft and aids in bonding the same to the core.

In Fig. 1 of the drawing the numeral 21 designates the layer or stratum of kraft pulp let down with from 8 to 30% of chip fiber pulp, while the numeral 22 refers to the exposed layer or ply which may comprise a more highly absorbent stock which is highly desirable in the production of what is referred to in the art as plaster lath.

I claim:

1. Wallboard comprising a set core of gypsum and a multi-ply paper facing sheet bonded thereto, the plies of which possess different fiber compositions, said sheet having a thickness of less than about 0.015 inch and a weight of less than about 45 pounds per thousand square feet, the exposed surface of said sheet comprising a ply of waste fibers, the bonded surface comprising a ply of chemical fibers mixed with about 8% to 30% of waste fibers based upon the weight of the chemical fibers.

2. Wallboard comprising a set core of gypsum and a multi-ply paper facing sheet bonded thereto, the plies of which possess different fiber compositions, said sheet having a weight of less than about 45 pounds per thousand square feet, the exposed surface of said sheet comprising a ply of waste fibers, the bonded surface comprising a ply of chemical fibers mixed with about 8% to 30% of waste fibers based upon the weight of the chemical fibers.

DEAN D. CRANDELL.